(12) United States Patent
Kachi et al.

(10) Patent No.: US 8,688,354 B2
(45) Date of Patent: Apr. 1, 2014

(54) FUEL INJECTION CONTROL APPARATUS

(75) Inventors: Masahiro Kachi, Susono (JP); Shinya Kondo, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 330 days.

(21) Appl. No.: 13/082,518

(22) Filed: Apr. 8, 2011

(65) Prior Publication Data

US 2011/0251779 A1   Oct. 13, 2011

(30) Foreign Application Priority Data

Apr. 8, 2010   (JP) .................................. 2010-089735

(51) Int. Cl.
   *F02D 41/30* (2006.01)

(52) U.S. Cl.
   USPC .......................................... 701/103; 701/104

(58) Field of Classification Search
   USPC ............... 701/103, 104, 110, 114; 123/599.1, 123/559.1; 60/276, 277, 285, 299
   See application file for complete search history.

(56) References Cited

U.S. PATENT DOCUMENTS

| | | | |
|---|---|---|---|
| 7,121,085 B2 * | 10/2006 | van Nieuwstadt | 60/286 |
| 2005/0022514 A1 * | 2/2005 | Kitahara | 60/285 |
| 2005/0027431 A1 * | 2/2005 | Todoroki et al. | 701/105 |
| 2005/0216176 A1 * | 9/2005 | Ichimoto et al. | 701/112 |
| 2009/0223208 A1 * | 9/2009 | Kojima et al. | 60/286 |
| 2010/0126142 A1 * | 5/2010 | Murata et al. | 60/278 |
| 2010/0312451 A1 * | 12/2010 | Karnik et al. | 701/102 |

FOREIGN PATENT DOCUMENTS

| | | | |
|---|---|---|---|
| JP | 07166918 A | 6/1995 | |
| JP | 2003343242 A | 12/2003 | |
| JP | 2003343318 A | 12/2003 | |
| JP | 2006037921 A | 2/2006 | |
| JP | 2009019521 A | 1/2009 | |

* cited by examiner

*Primary Examiner* — John T. Kwon
*Assistant Examiner* — Johnny Hoang
(74) *Attorney, Agent, or Firm* — Gifford, Krass, Sprinkle, Anderson & Citkowski, P.C.

(57) ABSTRACT

A fuel injection control apparatus of the invention includes: a temperature acquisition portion that estimates the present temperature of a catalyst and the convergence temperature of the catalyst; an increase value calculation portion that calculates a base OT increase value that is an increase value for the fuel injection amount that a fuel injection valve provided in an internal combustion engine needs to inject, on the basis of the present temperature and the convergence temperature of the catalyst estimated by the temperature acquisition portion; a correction portion that calculates an OT increase correction-reflected value by correcting the base OT increase value on the basis of the present temperature and the convergence temperature if the present temperature is lower than the convergence temperature; and an increase value determination portion that selects one of the base OT increase value and the OT increase correction-reflected value as the OT increase value for the fuel injection amount that the fuel injection valve needs to inject, on the basis of the base OT increase value and the OT increase correction-reflected value.

5 Claims, 8 Drawing Sheets

CONVERGENCE TEMPERATURE T1 ----
PRESENT TEMPERATURE T2 ———
OT CRITERION TEMPERATURE T3 ------

FIG. 4B

BASE OT INCREASE VALUE D1 ----
OT INCREASE CORRECTION-
REFLECTED VALUE D2 ———

FUEL INJECTION CONTROL APPARATUS

CROSS-REFERENCE TO RELATED APPLICATIONS

This application claims priority to Japanese Patent Application No. 2010-089735 filed on Apr. 8, 2010, which is incorporated herein by reference in its entirety including the specification, drawings and abstract.

BACKGROUND OF THE INVENTION

1. Field of the Invention

The invention relates to a fuel injection control apparatus.

2. Description of the Related Art

Internal combustion engines (engines) are equipped with catalysts for controlling exhaust gas. For example, in the case where such a catalyst is overheated by high temperature exhaust gas or the like, the exhaust gas control capability of the catalyst sometimes declines. The decline in the exhaust gas control capability of a catalyst occurs due to the catalyst temperature rising above the activation temperature of the catalyst, or the like. In order to maintain good level of the exhaust gas control capability of the catalyst, a technology of increasing the amount of fuel injection so that due to the increased vaporization heat of injected fuel the temperature of exhaust gas declines and therefore the catalyst is cooled is sometimes used. The increase of fuel in this technology is termed OT (over-temperature protection) increase. The amount of increase of fuel achieved by the OT increase is termed OT increase value.

Japanese Patent Application Publication No. 7-166918 (JP-A-7-166918) discloses a technology that prevents overheating of a catalyst by calculating the OT increase value. Japanese Patent Application Publication No. 2003-343242 (JP-A-2003-343242) discloses a technology that estimates the temperature of a catalyst according to the rotation speed and the load of an internal combustion engine, and that performs an OT determination regarding the catalyst (a determination as to whether or not the catalyst is overheated) on the basis of the estimated temperature of the catalyst.

However, as for the foregoing related-art technologies, it sometimes happens that, the fuel injection amount is excessively increased by the OT increase, resulting in increased amounts of exhaust emissions, for example, carbon monoxide (CO), hydrocarbons (HCs), etc., or deteriorated fuel economy.

SUMMARY OF THE INVENTION

The invention provides a fuel injection control apparatus capable of appropriately controlling the OT increase.

A first aspect of the invention is a fuel injection control apparatus comprising: a temperature acquisition portion that acquires temperature of a catalyst provided in an exhaust system of an internal combustion engine, and that acquires convergence temperature of the catalyst; an increase value calculation portion that calculates a first increase value that is an increase value of a fuel injection amount that a fuel injection valve provided in the internal combustion engine needs to inject in order to cool the catalyst, based on the temperature of the catalyst and the convergence temperature of the catalyst acquired by the temperature acquisition portion; a correction portion that calculates a second increase value by correcting the first increase value based on the temperature of the catalyst and the convergence temperature of the catalyst, if the temperature of the catalyst is lower than the convergence temperature; and an increase value determination portion that selects one of the first increase value and the second increase value as the increase value for the fuel injection amount that the fuel injection valve needs to inject, based on the temperature of the catalyst, the convergence temperature of the catalyst, the first increase value and the second increase value. According to this aspect, it becomes possible to appropriately control the OT (over-temperature protection) increase.

In the foregoing construction, in a case where the temperature of the exhaust system is lower than the convergence temperature of the exhaust system and the second increase value is smaller than the first increase value, the increase value determination portion may select the second increase value as the increase value, and in at least one of a case where the temperature of the exhaust system is higher than the convergence temperature and a case where the second increase value is greater than the first increase value, the increase value determination portion may select the first increase value as the increase value. According to this construction, by changing the OT increase value, it becomes possible to restrain the amount of fuel injection from becoming excessively large and therefore appropriately control the OT increase value.

In the foregoing construction, in a case where the temperature of the exhaust system is higher than the convergence temperature of the exhaust system and the second increase value is smaller than the first increase value, the increase value determination portion may select the second increase value as the increase value, and in a case where the temperature of the exhaust system is higher than the convergence temperature and the second increase value is greater than the first increase value, the increase value determination portion may select the first increase value as the increase value. According to this construction, it becomes possible to more appropriately control the OT increase.

According to the invention, it is possible to provide a fuel injection control apparatus capable of appropriately controlling the OT increase.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF THE EMBODIMENTS

Embodiments of the invention will be described with reference to the drawings.

Figure 1:
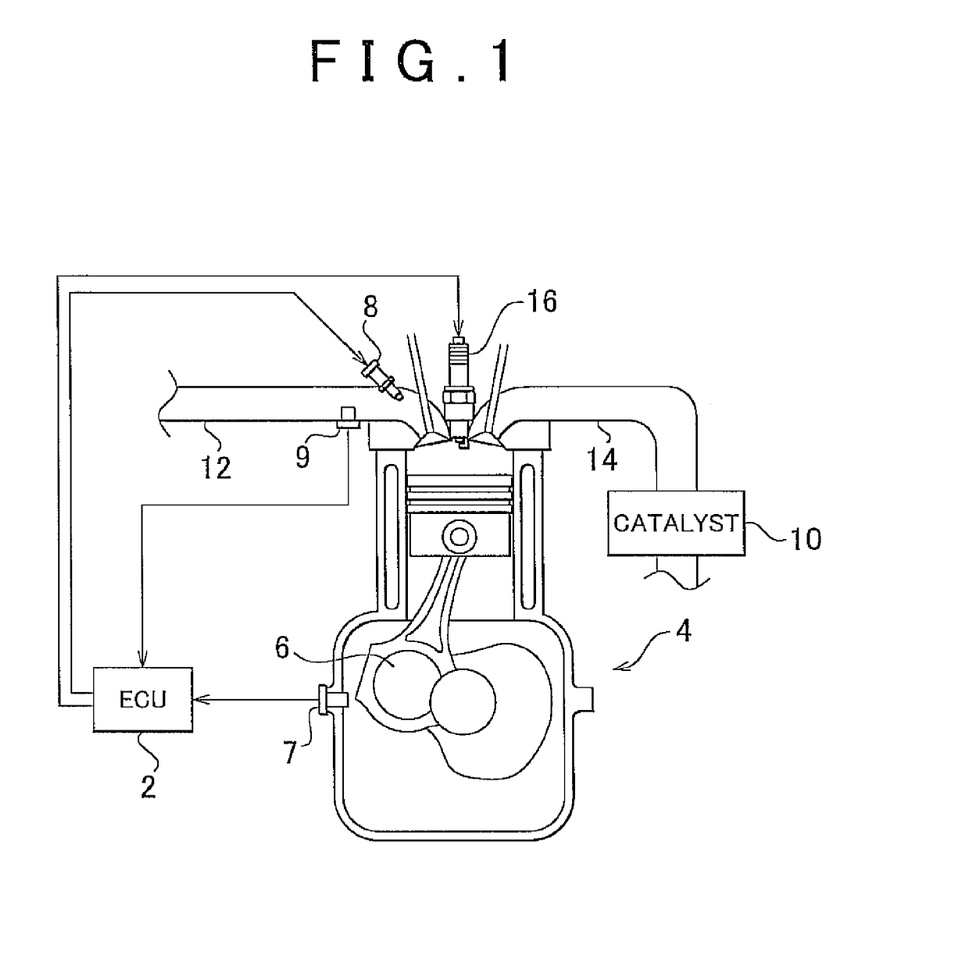
FIG. 1 is a schematic diagram exemplifying an engine to which a fuel injection control apparatus in accordance with Embodiment 1 of the invention is applied.

Firstly, a construction of a fuel injection control apparatus will be described. FIG. 1 is a schematic diagram exemplifying an internal combustion engine to which a fuel injection control apparatus in accordance with Embodiment 1 of the invention is applied.

As shown in FIG. 1, the engine includes an ECU (engine control unit) 2, an engine main body 4, a crankshaft 6, a crank angle sensor 7, a fuel injection valve 8, an intake gas sensor 9, a catalyst 10, an intake pipe 12, an exhaust pipe 14, and an ignition plug 16.

The engine main body 4 is provided with the fuel injection valve 8, the intake pipe 12, the exhaust pipe 14 and the ignition plug 16. The crank angle sensor 7 is provided on a cylinder of the engine main body 4, and detects the crank angle of the crankshaft 6. The fuel injection valve 8 and the intake gas sensor 9 are provided in the intake pipe 12. The fuel injection valve 8 injects fuel. The intake gas sensor 9 detects the amount of intake air that is taken into the engine main body 4 through the intake pipe 12. The catalyst 10 is provided in the exhaust pipe 14, and removes undesired substances from exhaust gas that is discharged from the engine main body 4. The ECU 2 acquires the crank angle detected by the crank angle sensor 7, and the amount of intake air detected by the fuel injection valve 8. Besides, the ECU 2 controls the injection of fuel performed by the fuel injection valve 8, and the ignition performed by the ignition plug 16.

Figure 2:
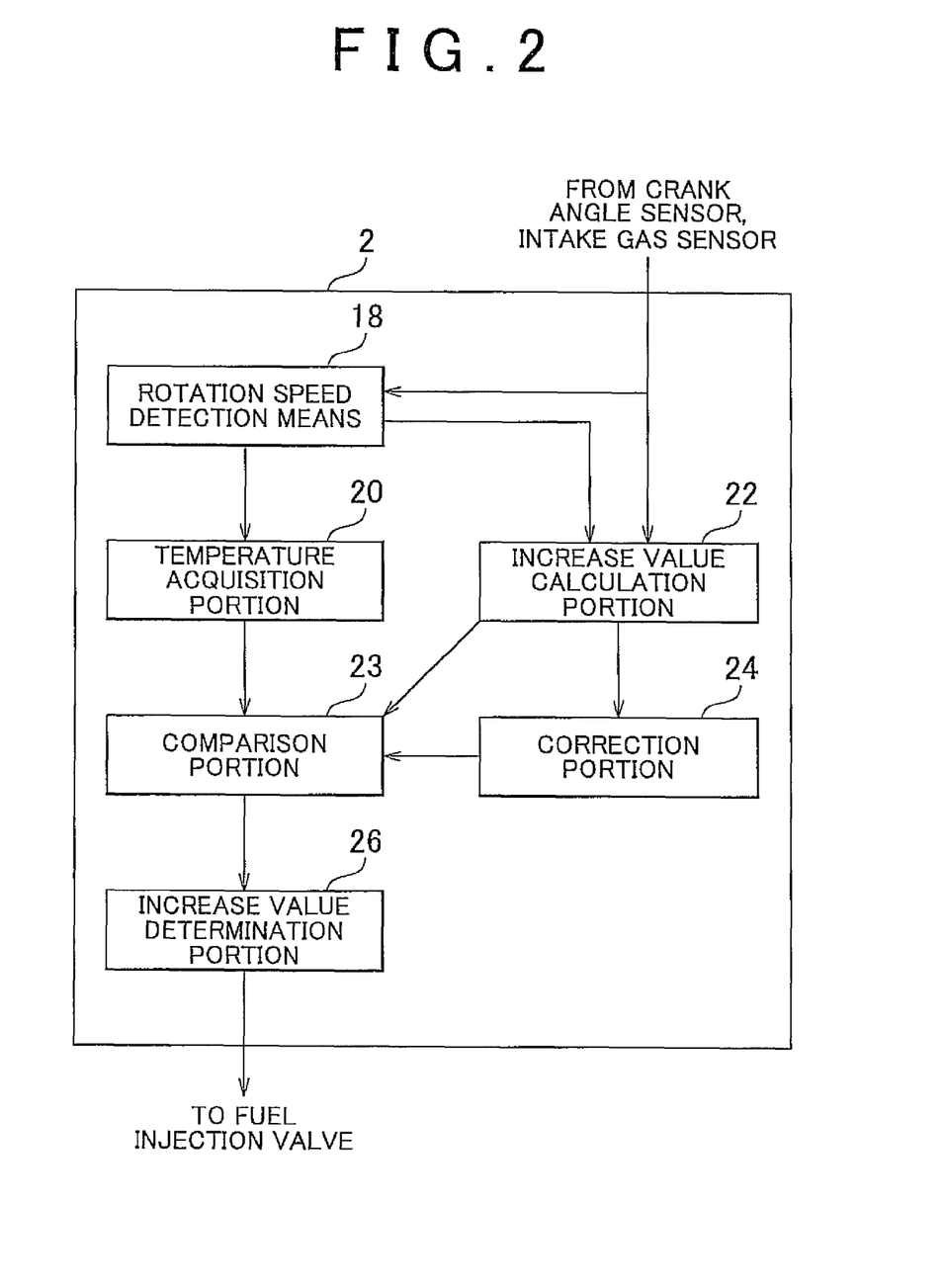
FIG. 2 is a function block diagram exemplifying the fuel injection control apparatus in accordance with Embodiment 1.

FIG. 2 is a function block diagram exemplifying the fuel injection control apparatus in accordance with Embodiment 1. As show in FIG. 2, the ECU 2 functions as a rotation speed detection portion 18, a temperature acquisition portion 20, an increase value calculation portion 22, a comparison portion 23, a correction portion 24, and an increase value determination portion 26.

The rotation speed detection portion 18 acquires the crank angle detected by the crank angle sensor 7, and detects the rotation speed of the engine on the basis of the crank angle. The temperature acquisition portion 20 acquires a convergence temperature T1 of the catalyst 10, the temperature T2 of the catalyst 10 (hereinafter, the present temperature T2) on the basis of the amount of intake gas detected by the intake gas sensor 9 and the engine rotation speed detected by the rotation speed detection portion 18. The convergence temperature is a temperature to which the temperature of an exhaust system converges when the engine is operated at a given amount of intake gas and a given rotation speed of the engine. The present temperature T2 is found, for example, through an "annealing" process on the basis of the convergence temperature T1.

The increase value calculation portion 22 calculates the OT increase value for the amount of fuel that the fuel injection valve 8 needs to inject, on the basis of the intake gas amount and the engine rotation speed. The value calculated by the increase value calculation portion 22 is termed the base OT increase value (first increase value). The base OT increase value is defined, for example, as an increase value that causes the temperature of the catalyst 10 to decline from the convergence temperature T1 to an OT criterion temperature T3. The comparison portion 23 compares the convergence temperature, the present temperature and the OT criterion temperature to determine a magnitude relation among them. The comparison portion 23 also compares the base OT increase value and an OT increase correction-reflected value to determine a magnitude relation therebetween.

The correction portion 24 is able to correct the OT base OT increase value calculated by the increase value calculation portion 22 and thus calculate OT increase correction-reflected value (second increase value), on the basis of the convergence temperature and the present temperature that are acquired by the temperature acquisition portion 20. The increase value determination portion 26 selects one of the base OT increase value and the OT increase correction-reflected value as a final OT increase value, on the basis of the convergence temperature, the present temperature, the base OT increase value and the OT increase correction-reflected value. That is, the amount of fuel that has been increased by the OT increase value determined by the increase value determination portion 26 is injected from the fuel injection valve 8. This will be described in detail later.

Figure 3:
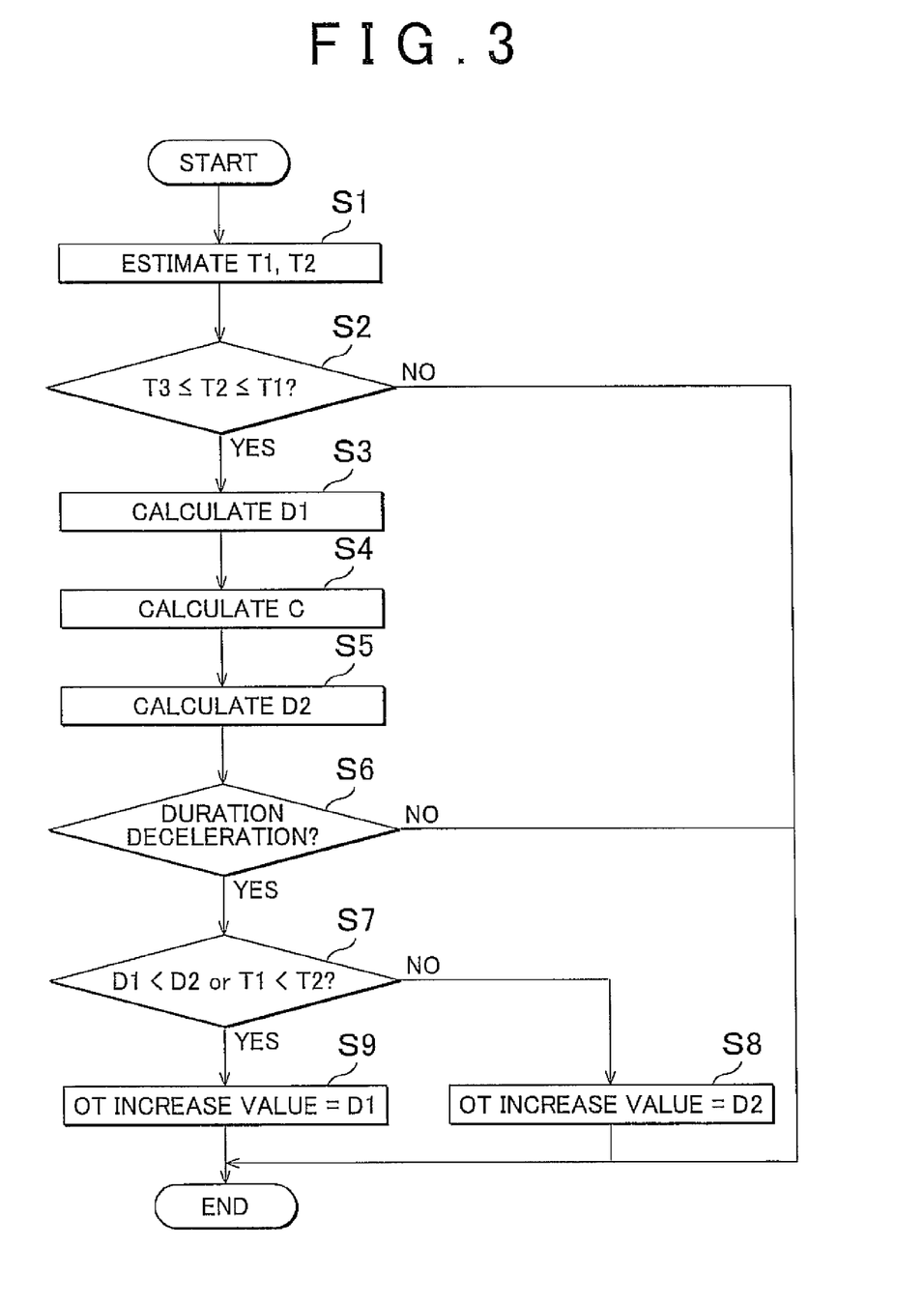
FIG. 3 is a flowchart exemplifying a control performed by the fuel injection control apparatus in accordance with Embodiment 1.

FIG. 3 is a flowchart exemplifying a control performed by the fuel injection control apparatus in accordance with Embodiment 1.

As shown in FIG. 3, firstly, the temperature acquisition portion 20 acquires the convergence temperature T1 of the catalyst 10 and the present temperature T2 of the catalyst 10 on the basis of the intake air amount detected by the intake gas sensor 9 and the engine rotation speed detected by the rotation speed detection portion 18 (step S1). More specifically, the temperature acquisition portion 20 calculates the load of the engine from the intake air amount, and then estimates the temperatures T1 and T2 on the basis of the engine load and the engine rotation speed.

After step S1, it is determined whether or not the present temperature T2 acquired by the temperature acquisition portion. 20 is higher than or equal to the OT criterion temperature T3, which is a predetermined temperature, and is lower than or equal to the convergence temperature T1 (step S2). The OT criterion temperature is a temperature for determining whether or not the catalyst 10 is in an overheated state. That is, if the present temperature is higher than or equal to the DT criterion temperature, it is determined that the catalyst 10 is in the overheated state.

If the answer in step S2 is NO, the control ends. That is, since the answer NO in step S2 means that the catalyst 10 is not in the overheated state, the OT increase does not need to be carried out. If the answer in step S2 is YES, the increase value calculation portion 22 calculates a base OT increase value D1 on the basis of the intake air amount and the engine rotation speed (step S3). More specifically, the increase value calculation portion 22 calculates the load of the engine from the intake air amount, and calculates the base OT increase value D1 on the basis of the engine load and the engine rotation speed.

After step S3, the correction portion 24 calculates a correction coefficient C for correcting the base OT increase value D1 (step S4). The correction coefficient C is calculated as in the following expression (1):

$$C=(T2-T3)/(T1-T3) \qquad (1)$$

After step S4, the correction portion 24 calculates an OT increase correction-reflected value D2 on the basis of base OT increase value D1 and the correction coefficient C (step S5).

The OT increase correction-reflected value D2 is calculated through the use of the following expression (2):

$$D2 = C \times D1 \quad (2)$$

After step S5, the ECU 2 determines whether or not the vehicle is decelerating (step S6). If the answer in step S6 is NO, the control ends. If the answer in step S6 is YES, the comparison portion 23 determines whether or not the OT increase correction-reflected value D2 is higher than the base OT increase value D1 or the present temperature T2 is higher than the convergence temperature T1 (step S7). If the answer in step S7 is NO, the increase value determination portion 26 sets the OT increase value to the OT increase correction-reflected value D2 (step S8). That is, the increase value determination portion 26 sets the OT increase value to the OT increase correction-reflected value D2 if the present temperature T2 is lower than the convergence temperature T1 and the OT increase correction-reflected value D2 is smaller than the base OT increase value D1.

If the answer in step S7 is YES, the increase value determination portion 26 determines that the base OT increase value D1 is to be used as the OT increase value (step S9). That is, the increase value determination portion 26 sets the OT increase value to the base OT increase value D1 in at least one of the case where the present temperature T2 is higher than the convergence temperature T1 and the case where the OT increase correction-reflected value D2 is greater than the base OT increase value D1. After step S9, the control ends.

Figure 4A:
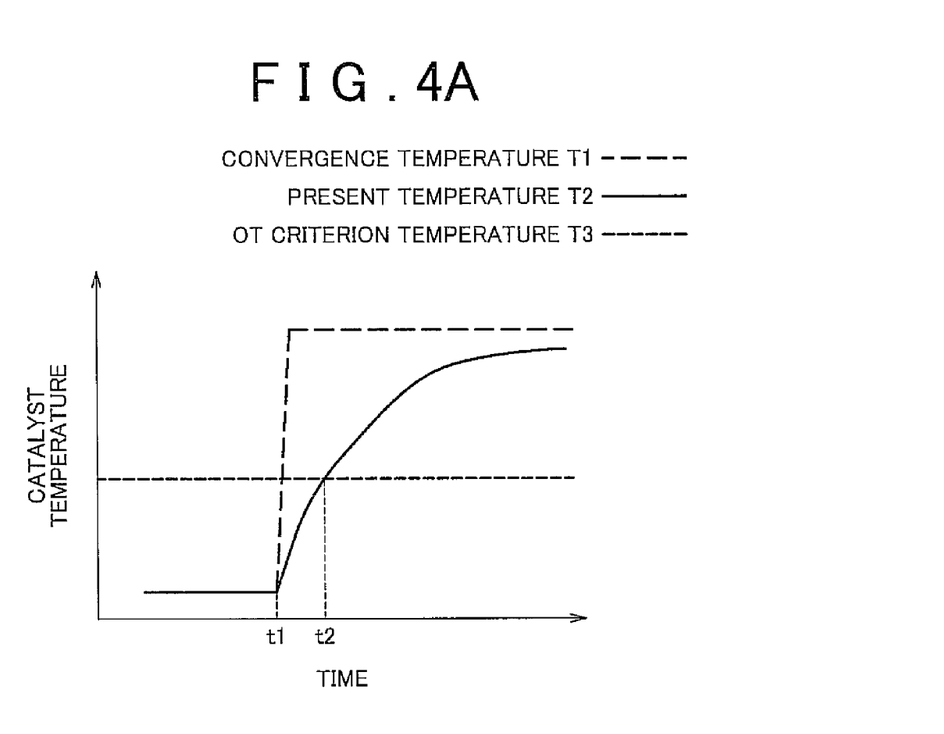
FIG. 4A is a diagram exemplifying a relation between time and the temperature of a catalyst.
Figure 4B:
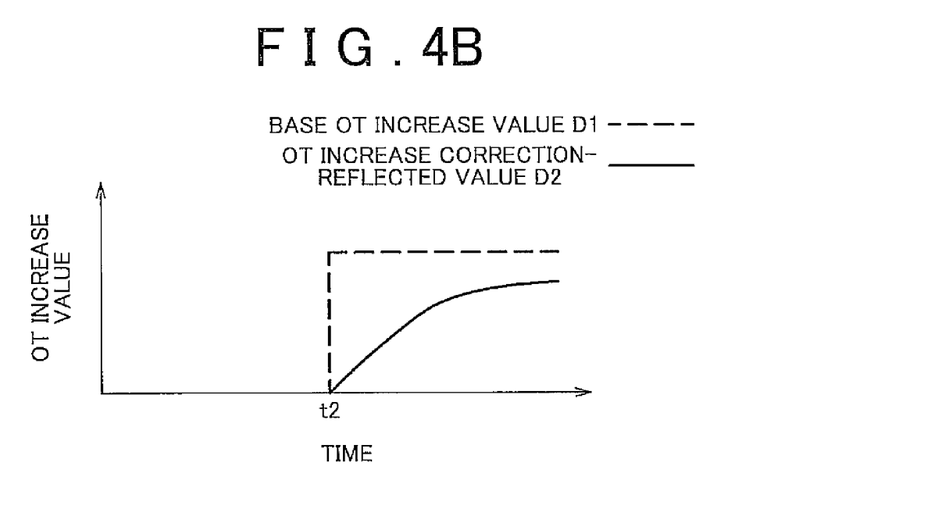
FIG. 4B is diagram exemplifying a relation between time and the OT increase value.

In order to describe the foregoing control in more details, a relation between the temperature of the catalyst and the OT increase value will be described. FIG. 4A is a diagram exemplifying a relation between time and the temperature of the catalyst, and FIG. 4B is a diagram exemplifying a relation between time and the OT increase value. In FIG. 4A and FIG. 4B, the horizontal axis represents time. The vertical axis in FIG. 4A represents the temperature of the catalyst 10. The vertical axis in FIG. 4B represents the OT increase value. In the following description, the case where the excess air factor λ is 1, that is, the case where the ideal air/fuel ratio is achieved, is assumed.

As shown in FIG. 4A, the present temperature T2 of the catalyst 10 starts to rise at time t1, and becomes higher than the OT criterion temperature T3 at time t2. The convergence temperature T1 at this time is higher than the present temperature T2 and the OT criterion temperature T3. That is, the situation from the time t2 on corresponds to the case where the answer in step S2 in FIG. 3 is YES.

As shown by an interrupted line in FIG. 4B, the increase value calculation portion 22 calculates a base OT increase value D1 (step S3 in FIG. 3). For example, the base OT increase value D1 is determined so that if the fuel injection is performed on the basis of the base OT increase value D1 used as the OT increase value, the temperature of the catalyst 10 declines from the convergence temperature T1 to the OT criterion temperature T3. If the fuel injection valve 8 injects fuel on the basis of the base OT increase value D1 used as the OT increase value, the vaporization heat of the injected fuel results in a decreased temperature of exhaust gas, so that the catalyst 10 can be cooled.

However, if the base OT increase value D1 is used as the OT increase value, the fuel injection amount sometimes becomes excessive. That is, in the case where the present temperature T2 is lower than the convergence temperature T1, as in the case where the answer in step S2 is YES, the use of the base OT increase value D1 as the OT increase value results in an excessive amount of fuel injection. If the amount of fuel injection becomes excessive, the catalyst 10 is sometimes cooled to a temperature that is lower than the activation temperature of the catalyst 10. If the catalyst 10 is excessively cooled, the exhaust emission may deteriorate and the fuel economy may deteriorate due to an increase in the amount of fuel injection.

Therefore, as shown by a solid line in FIG. 4B, the correction portion 24 calculates a correction coefficient C, and then calculates an OT increase correction-reflected value D2 (step S4 in FIG. 3). Since the OT increase correction-reflected value D2 is smaller than the base OT increase value D1, the use of the OT increase correction-reflected value D2 restrains the fuel injection amount from becoming excessively large (step S8 in FIG. 3).

Figure 5A:
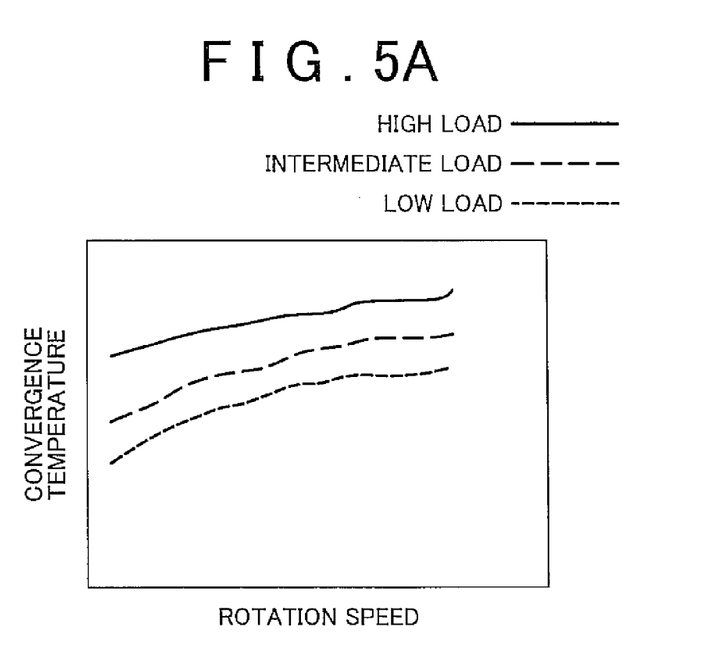
FIG. 5A is a diagram exemplifying relations among the engine load, the engine rotation speed and the convergence temperature.
Figure 5B:
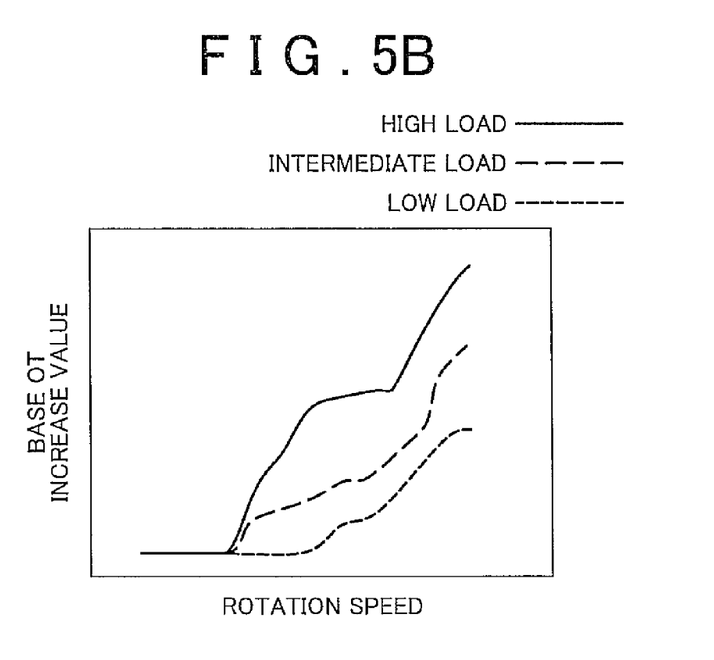
FIG. 5B is a diagram exemplifying relations among the engine load, the engine rotation speed and the base OT increase value.

However, there are cases where the use of the OT increase correction-reflected value D2 results in excessive amount of fuel injection, contrary to the cases shown in FIGS. 4A and 4B. Such cases will be described below. FIG. 5A is a diagram exemplifying a relation between the engine rotation speed and the convergence temperature, and FIG. 5B is a diagram exemplifying a relation between the engine rotation speed and the base OT increase value. In FIGS. 5A and 5B, the horizontal value shows the engine rotation speed. The vertical axis in FIG. 5A represents the convergence temperature T1, and the vertical axis in FIG. 5B represents the base OT increase value D1. Besides, in FIGS. 5A and 5B, solid lines, interrupted lines and dotted lines show the cases of high engine load, intermediate engine load and low engine load, respectively.

As shown in FIGS. 5A and 5B, the higher the engine rotation speed, the greater the convergence temperature T1 and the base OT increase value D1 become. Besides, the higher the engine load, the greater the values T1 and D1. In other words, the convergence temperature T1 and the base OT increase value D1 become smaller the lower the engine rotation speed or the lower the engine load.

For example, when the vehicle is decelerating, the rotation speed of the engine declines. That is, during deceleration, the convergence temperature T1 and the base OT increase value D1 decrease.

Figure 6A:
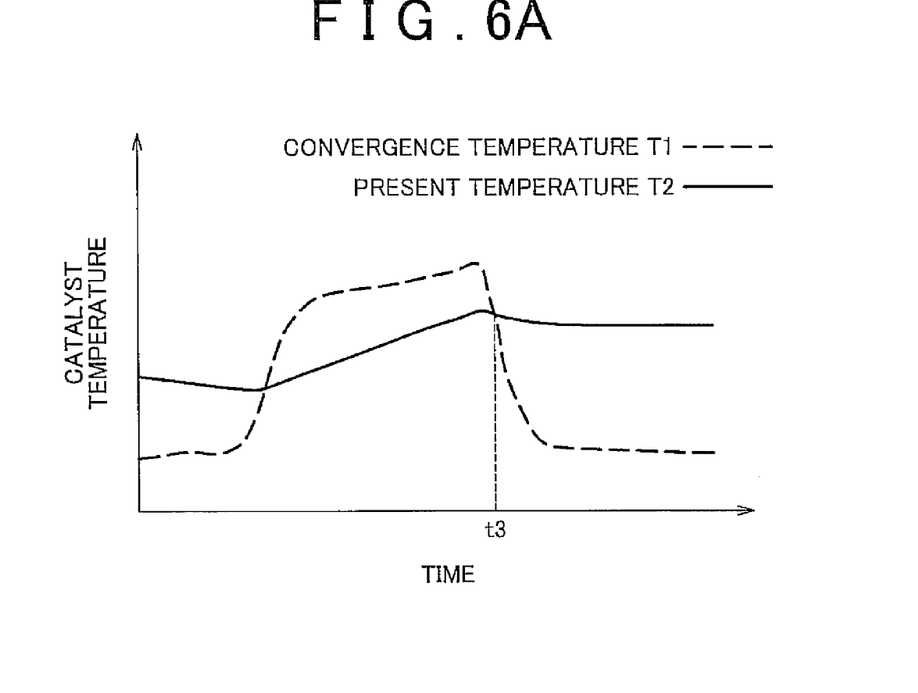
FIG. 6A is a diagram exemplifying a relation between time and the temperature of a catalyst.
Figure 6B:
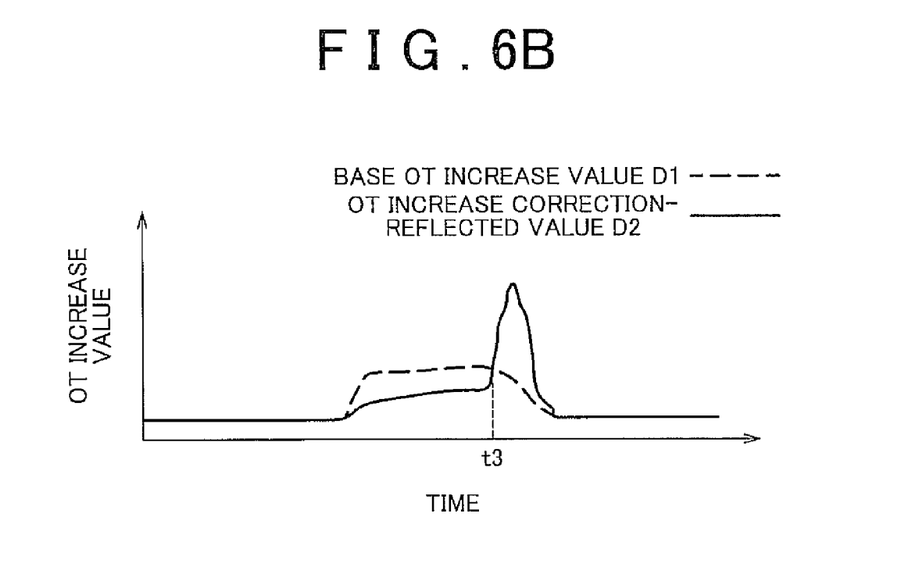
FIG. 6B is a diagram exemplifying a relation between time and the OT increase value.

This will be further described with reference to drawings. FIG. 6A is a diagram exemplifying a relation between time and the temperature of the catalyst, and FIG. 6B is a diagram exemplifying a relation between time and the OT increase value. In the following description, the case where the vehicle is decelerating is assumed.

As shown in FIG. 6A, at time t3, the convergence temperature T1 that the temperature acquisition portion 20 estimates becomes lower than the present temperature T2. This is because the vehicle is decelerating and therefore the rotation speed of the engine has accordingly declined. Besides, as shown in FIG. 6B, the base OT increase value D1 also begins to decline.

At this time, the correction portion 24, using the foregoing expression (2), calculates an OT increase correction-reflected value D2 that is larger than the OT increase correction-reflected value D2 calculated before the time t3. If the foregoing large OT increase correction-reflected value D2 is used as the OT increase value, the amount of fuel injection becomes excessively large.

Therefore, the increase value determination portion 26 sets the OT increase value to the base OT increase value D1 instead of the OT increase correction-reflected value D2 (step S9 in FIG. 3). Since the base OT increase value D1 is smaller than the OT increase correction-reflected value D2, the use of the base OT increase value D1 causes the amount of fuel injection to become smaller.

That is, the fuel injection control apparatus in accordance with Embodiment 1 uses the OT increase correction-reflected value D2 as the OT increase value when the use of the base OT increase value D1 causes the amount of fuel injection to become excessively large as shown in FIG. 4A and FIG. 4B. When the use of the OT increase correction-reflected value D2 causes the amount of fuel injection to become excessively large as shown in FIG. 6A and FIG. 6B, the fuel injection control apparatus uses the base OT increase value D1. That is, according to Embodiment 1, by changing the OT increase value, the fuel injection control apparatus is able to restrain the fuel injection amount from becoming excessively large, and thus is able to appropriately control the OT increase value. As a result, deterioration of exhaust emission and deterioration of fuel economy can be restrained.

Although deceleration of the vehicle is assumed above as an example of the case where the use of the OT increase correction-reflected value D2 causes the amount of fuel injection to become excessively large, the case is not limited so. That is, not only during deceleration but in any case where the use of the OT increase correction-reflected value D2 causes the fuel injection amount to become excessive, the OT increase value can be appropriately controlled by performing the control of step S9 in FIG. 3.

Although in step S2 in FIG. 3, the comparison portion 23 determines whether or not the present temperature T2 is higher than or equal to the OT criterion temperature T3, the comparison portion 23 may instead determine whether or not the present temperature T2 is higher than the OT criterion temperature T3. Besides, although in step S2 the comparison portion 23 determines whether or not the present temperature T2 is lower than or equal to the convergence temperature T1, the comparison portion 23 may instead determine whether or no the present temperature T2 is lower than the convergence temperature T1.

Besides, although in step S7 the comparison portion 23 determines whether or not the OT increase correction-reflected value D2 is greater than the base OT increase value D1, the comparison portion 23 may instead determine whether or not the OT increase correction-reflected value D2 is greater than or equal to the base OT increase value D1. Besides, although in step S7 the comparison portion 23 determines whether or not the present temperature T2 is higher than the convergence temperature T1, the comparison portion 23 may instead determine whether or not the present temperature T2 is higher than or equal to the convergence temperature T1.

Figure 7:
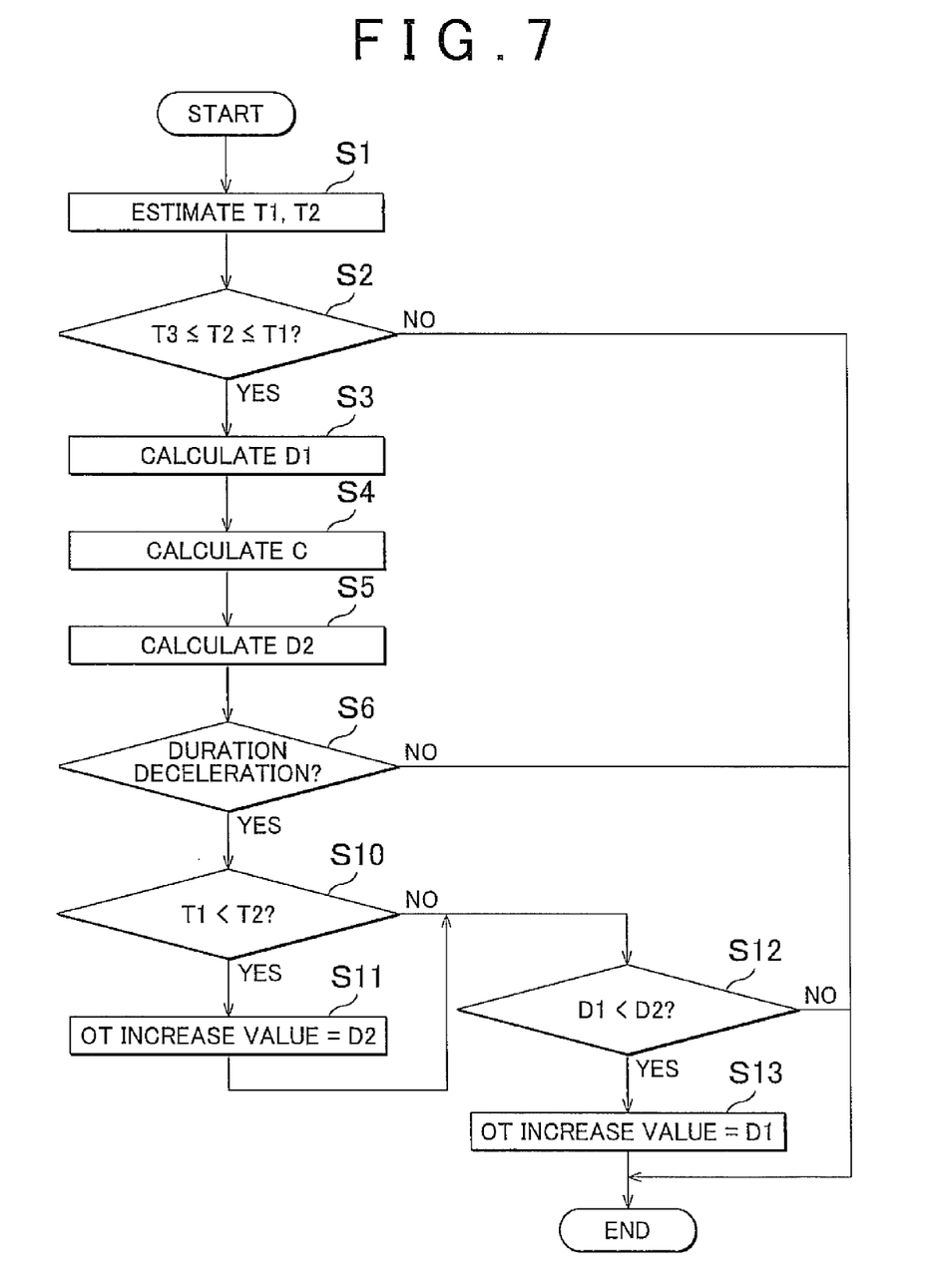
FIG. 7 is a flowchart exemplifying a control performed by a fuel injection control apparatus in accordance with Embodiment 2.

Embodiment 2 described below is an embodiment in which the foregoing determination is performed more minutely. The construction of the fuel injection control apparatus of this embodiment is the same as that shown in FIGS. 1 and 2. FIG. 7 is a flowchart exemplifying a control performed by the fuel injection control apparatus in accordance with Embodiment 2. The control process of steps S1 to S6 in FIG. 7 is the same as that of steps S1 to S6 shown in FIG. 3.

As shown in FIG. 7, subsequently to the answer YES in step S6, the comparison portion 23 determines whether or not the convergence temperature T1 is lower than the present temperature T2 (step S10). If the answer in step S10 is NO, the control process proceeds to step S12 (described later). If the answer is YES, the increase value determination portion 26 determines that the OT increase correction-reflected value D2 is to be used as the OT increase value (step S11). After step S11, the control process proceeds to step S12.

The comparison portion 23 determines whether or not the base OT increase value D1 is smaller than the OT increase correction-reflected value D2 (step S12). If the answer in step S12 is NO, the control process ends. If the answer is YES, the increase value determination portion 26 determines that the base OT increase value D1 is to be used as the OT increase value (step S13). That is, when the present temperature T2 is higher than the convergence temperature T1 and the OT increase correction-reflected value D2 is smaller than the base OT increase value D1, the increase value determination portion 26 sets the OT increase value to the OT increase correction-reflected value D2. On another hand, when the present temperature T2 is higher than the convergence temperature T1 and the OT increase correction-reflected value D2 is greater than the base OT increase value D1, the increase value determination portion 26 sets the OT increase value to the base OT increase value D1. After step S13, the control ends.

Figure 8A:
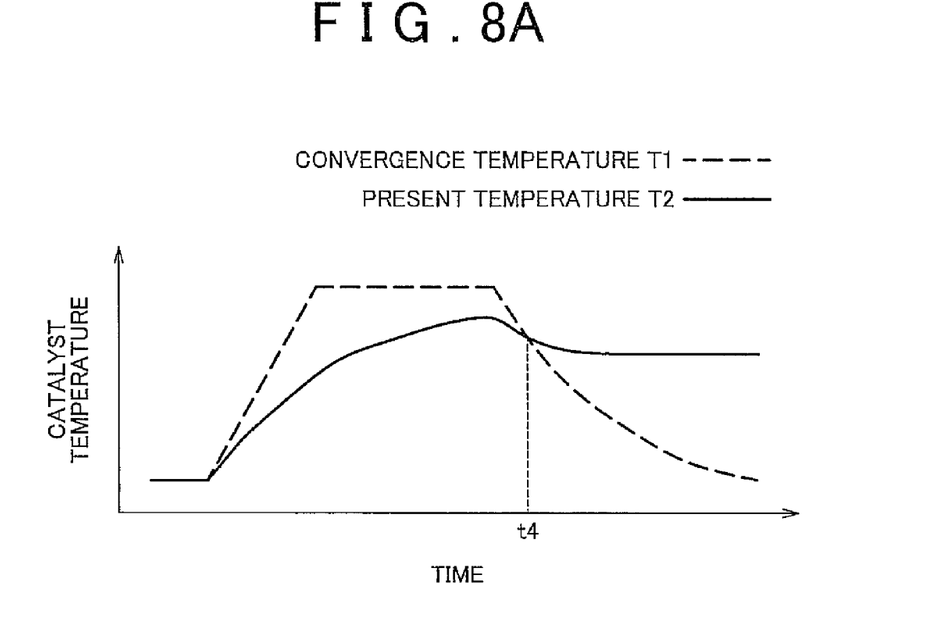
FIG. 8A is a diagram exemplifying a relation between time and the temperature of a catalyst.
Figure 8B:
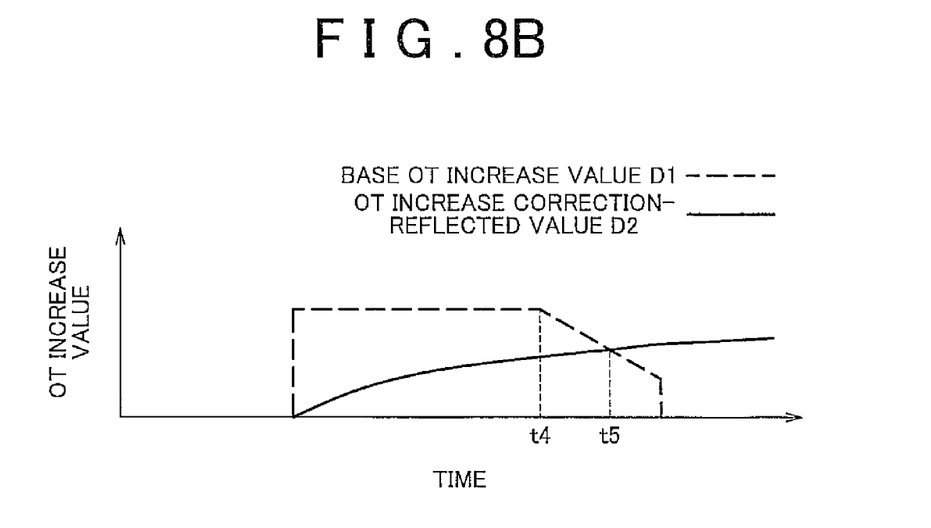
FIG. 8B is a diagram exemplifying a relation between time and the OT increase value.

In order to describe the foregoing control in more details, a relation between the temperature of the catalyst and the OT increase value will be described. FIG. 8A is a diagram exemplifying a relation between time and the temperature of the catalyst, and FIG. 8B is a diagram exemplifying a relation between time and the OT increase value. The case where the vehicle is decelerating will be assumed as in the foregoing description in conjunction with FIGS. 6A and 6B.

As shown in FIG. 8A, at time t4, the convergence temperature T1 becomes lower than the present temperature T2. This corresponds to the case where the answer in step S10 in FIG. 7 is YES. Besides, at the time t4, the base OT increase value D1 begins to decline, and at time t5, the base OT increase value D1 becomes smaller than the OT increase correction-reflected value D2. The situation from the time t5 on corresponds to the case where the answer in step S12 in FIG. 7 is YES.

During the period of time t4 to t5, the increase value determination portion 26 determines that the OT increase correction-reflected value D2 is to be used as the OT increase value (step S11 in FIG. 7). From the time t5 on, the increase value determination portion 26 determines that the base OT increase value D1 is to be used as the OT increase value (step S13 in FIG. 7). That is, the increase value determination portion 26 determines that the smaller one of the base OT increase value D1 and the OT increase correction-reflected value D2 is to be used as the OT increase value. According to Embodiment 2, it is possible to restrain fuel from being excessively injected, on the basis of even finer determination than in Embodiment 1.

Although in the foregoing embodiments the control is performed by using the present temperature and the convergence temperature of the catalyst 10, the applications of the invention are not limited so. For example, it is also permissible to use the temperature of an exhaust system component part other than the catalyst 10 which is detected by an AF (air flow) sensor, an $O_2$ sensor, etc. Besides, the temperature acquisition portion 20 may acquire temperature from a temperature sensor that is provided, for example, on the exhaust pipe 14.

While the embodiments of the invention have been described in detail above, the invention is not limited to the foregoing specific embodiments. On the contrary, various modifications and changes can be made without departing from the gist of the invention described in the appended claims for patent.

What is claimed is:

1. A fuel injection control apparatus comprising:
   a temperature acquisition portion that acquires a temperature of a catalyst provided in an exhaust system of an internal combustion engine, and that acquires a convergence temperature of the catalyst;
   an increase value calculation portion that calculates a first increase value that is an increase value of a fuel injection amount that a fuel injection valve provided in the internal combustion engine needs to inject in order to cool the catalyst, based on the temperature of the catalyst and the convergence temperature of the catalyst acquired by the temperature acquisition portion;

a correction portion that calculates a second increase value by correcting the first increase value based on the temperature of the catalyst and the convergence temperature of the catalyst, if the temperature of the catalyst is lower than the convergence temperature; and an increase value determination portion that selects one of the first increase value and the second increase value as the increase value for the fuel injection amount that the fuel injection valve needs to inject, based on the temperature of the catalyst, the convergence temperature of the catalyst, the first increase value and the second increase value.

2. The fuel injection control apparatus according to claim 1, wherein in a case where the temperature of the catalyst is lower than the convergence temperature of the catalyst and the second increase value is smaller than the first increase value, the increase value determination portion selects the second increase value as the increase value, and in at least one of a case where the temperature of the catalyst is higher than the convergence temperature and a case where the second increase value is greater than the first increase value, the increase value determination portion selects the first increase value as the increase value.

3. The fuel injection control apparatus according to claim 1, wherein in a case where the temperature of the catalyst is higher than the convergence temperature of the catalyst and the second increase value is smaller than the first increase value, the increase value determination portion selects the second increase value as the increase value, and in a case where the temperature of the catalyst is higher than the convergence temperature and the second increase value is greater than the first increase value, the increase value determination portion selects the first increase value as the increase value.

4. The fuel injection control apparatus according to claim 1, further comprising a comparison portion that compares the temperature of the catalyst, the convergence temperature of the catalyst and a predetermined criterion temperature for use for determination regarding an overheated state of the catalyst, wherein if the temperature of the catalyst is higher than the criterion temperature, the increase value determination portion selects the increase value for the fuel injection amount that the fuel injection valve needs to inject.

5. A fuel injection control method comprising:

acquiring a temperature of a catalyst provided in an exhaust system of an internal combustion engine, and a convergence temperature of the catalyst;

calculating a first increase value that is an increase value of a fuel injection amount that a fuel injection valve provided in the internal combustion engine needs to inject in order to cool the catalyst, based on the temperature of the catalyst and the convergence temperature of the catalyst acquired;

calculating a second increase value by correcting the first increase value based on the temperature of the catalyst and the convergence temperature of the catalyst, if the temperature of the catalyst is lower than the convergence temperature; and selecting one of the first increase value and the second increase value as the increase value for the fuel injection amount that the fuel injection valve needs to inject, based on the temperature of the catalyst, the convergence temperature of the catalyst, the first increase value and the second increase value.

* * * * *